UNITED STATES PATENT OFFICE.

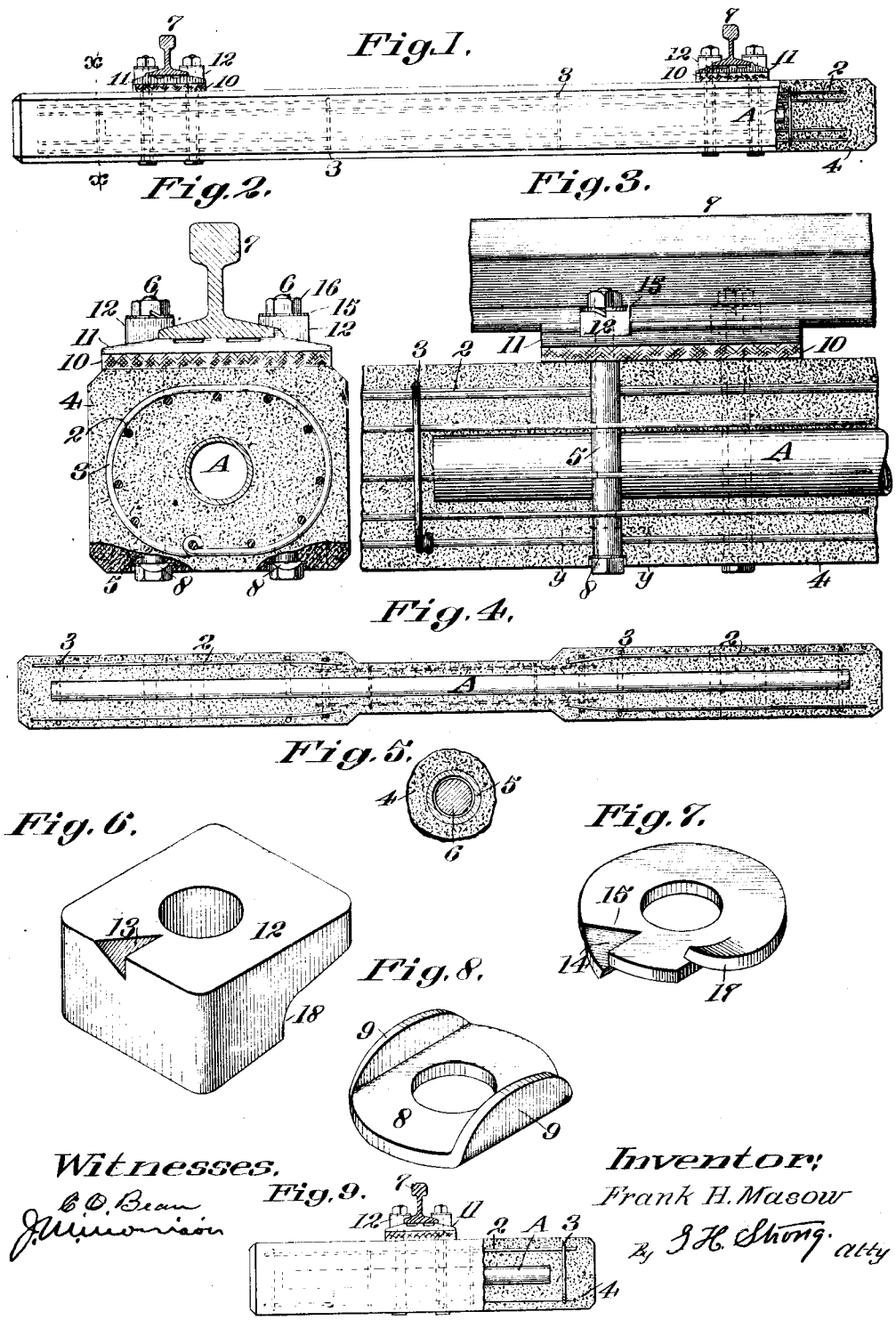
F. H. MASOW.
REINFORCED CONCRETE RAILROAD TIE.
APPLICATION FILED AUG. 10, 1912.
1,051,341. Patented Jan. 21, 1913.
Witnesses.
Inventor:
Frank H. Masow

FRANK H. MASOW, OF SAN FRANCISCO, CALIFORNIA.

REINFORCED-CONCRETE RAILROAD-TIE.

1,051,341.  Specification of Letters Patent.  Patented Jan. 21, 1913.

Application filed August 10, 1912. Serial No. 714,375.

*To all whom it may concern:*

Be it known that I, FRANK H. MASOW, a citizen of the United States, residing in the city and county of San Francisco and State of California, have invented new and useful Improvements in Reinforced-Concrete Railroad-Ties, of which the following is a specification.

This invention relates to a railroad tie, and means for connecting rails therewith, and particularly pertains to a tie formed of plastic material.

It is the object of this invention to provide a plastic railroad tie which is strong, durable, and economical in manufacture, and to provide a simple and efficient means for connecting the railroad rails to the tie.

The invention resides in forming the tie with a tubular metallic core, surrounding the same with an electrically welded mesh in the form of a cylinder and spaced from the core, embedding the core and mesh in a body of a suitable plastic material, such as cement or concrete, and providing fibrous tubes in the plastic body for the reception of bolts employed in attaching the rails to the tie.

The invention further consists of the parts and the construction and combination of parts as hereinafter more fully described and claimed, having reference to the accompanying drawings, in which—

Figure 1 is a side elevation with parts broken away, of a tie constructed in accordance with this invention. Fig. 2 is an enlarged detail section on the line X—X of Fig. 1, with parts broken away. Fig. 3 is a detail in side elevation of the tie with a portion of the plastic material removed. Fig. 4 is a longitudinal section of a modified form of the tie. Fig. 5 is an enlarged detail section on the line Y—Y of Fig. 3. Fig. 6 is a detail in perspective of the rail-engaging block. Fig. 7 is a detail in perspective of the nut-lock washer. Fig. 8 is a detail in perspective of the bolt-engaging washer. Fig. 9 is a view in elevation with parts broken away of the tie as constructed for a single rail.

In the drawings A represents a metallic tube of any suitable character which is designed to form the central portion or core of the tie and extends approximately the full length thereof; this tube A being designed to add strength and lightness to the tie.

Surrounding the tube A and spaced therefrom a distance approximately equal to the diameter of the tube, is a cylindrical structure formed of electrically welded wire fabric or netting, having longitudinally extending wires or rods 2 welded to transversely disposed rings 3. This netting is provided as a bonding agent and reinforcement for a body of plastic material 4, in which it and the tubular core A are embedded; the plastic material 4 forming the body of the tie.

The fabric cylinder may extend continuously throughout the length of the tie, as shown in Figs. 1 and 9, or it may be formed in sections as shown in Fig. 4, where it is desired to reduce the diameter of the tie at its center.

The plastic body of the tie is formed with vertical perforations which are lined with fibrous tubes 5; the tubes 5 being embedded in the plastic body when the latter is cast. These tubes 5 are designed to receive bolts 6 with which the rails 7 are held in place on the tie, and form a protection for the tie to prevent it being damaged by the insertion and withdrawal of the bolts and by horizontal strains on the latter.

Means are provided for preventing the bolts 6 from turning in the tubes 5. This means consists of washers 8 formed with outwardly projecting parallel flanges 9, which are embedded in the plastic body 4 at the lower ends of the tubes 5 with the flanges 9 extending downwardly. The flanges 9 are designed to project alongside of the flat sides of the head of the bolt 6 and thereby securely hold the bolts against turning.

Mounted on the upper face of the tie are fiber mats 10 which form resilient supports for the usual tie plates 11 on which the rails 7 rest in the ordinary manner. The rails 7, tie plates 11, and resilient fiber mats 10 are secured to the tie 4 by means of the bolts 6 which are inserted in the fiber tubes 5 with their threaded ends up and with their heads between the flanges 9 on the washers 8.

The threaded ends of the bolts 6 extend upward on each side of the base flanges on the rails 7 after passing through suitable perforations in the tie plates 11 and the resilient fiber mats 10, and mounted on the upwardly projecting ends of the bolts 6 are blocks 12, which are designed to rest on the tie plates and project over the bottom flanges of the rail 7, as particularly shown in Fig. 2.

The blocks 12 are formed with a notch 13 having a vertical wall against which a downwardly projecting tongue 14 on a washer 15 is designed to abut. Nuts 16 are screwed on the upper ends of the bolts 6 and tightened against the washer 15 after which a tongue 17 on each washer 15 is bent upwardly, so that its inner face will lie against one of the flat faces of the nut 16, and thereby prevent the latter from being accidentally unscrewed.

The washer 15 is prevented from turning in the direction traversed by the nut 16 on being unscrewed, by reason of the tongue 14 abutting against the vertical wall of the notch 13; the block 12 being prevented from turning by reason of a shoulder 18 formed on the underside thereof, abutting against the outer edge of the bottom flange of rail 7. When it is desired to remove the rail 7, the tongues 17 are depressed so as to move them clear of the side walls of the nuts 16, thereby permitting the latter to be unscrewed from the bolts 6 and permitting the blocks 12 and washers 15 being removed therefrom.

In the construction of this tie, the use of welded fabric 2 and 3 for the reinforcing and binding cylinder is preferred, owing to the strength of a metal fiber of this character being greater than that of interlacing strands.

It is manifest that any suitable composition may be employed in forming the body 4 of the tie, ordinary cement or concrete being preferred, and it is obvious that in some instances the use of the central tubular core A may be dispensed with.

In some instances it is not necessary to construct the tie to support a pair of rails, but it may be specially made to form a foundation for a single rail, as shown in Fig. 9, in which event it will be considerably shortened. If each rail of a track be thus supported independent of the other, the rails will be connected by tie rods to prevent spreading.

It is apparent that many structures other than railroad ties may be formed of the elements herein shown and described, such for instance, as posts, piles, telegraph poles and the like, and I therefore do not desire to be confined to the particular application herein referred to.

Having thus described my invention, what I claim and desire to secure by Letters Patent, is—

A railway tie comprising a central tube extending approximately the length of the tie, vertical tubes located upon each side of the horizontal tube and adapted to receive bolts by which the opposite flanges of a rail are secured, a cylindrical structure consisting of interspaced rings and longitudinal rods electrically welded together and spaced from the longitudinal tube a distance as great as the diameter of the tube, and a covering and filling of plastic material inclosing and embedding the tubes and surrounding structure.

In testimony whereof I have hereunto set my hand in the presence of two subscribing witnesses.

FRANK H. MASOW.

Witnesses:
C. O. BEAN,
J. M. MORRISON.